(12) United States Patent
Hawkins

(10) Patent No.: US 11,988,195 B2
(45) Date of Patent: May 21, 2024

(54) WIND TURBINE CONTROL ARRANGEMENT

(71) Applicant: Siemens Gamesa Renewable Energy A/S, Brande (DK)

(72) Inventor: Samuel Hawkins, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/918,846

(22) PCT Filed: Apr. 14, 2021

(86) PCT No.: PCT/EP2021/059615
§ 371 (c)(1),
(2) Date: Oct. 13, 2022

(87) PCT Pub. No.: WO2021/213853
PCT Pub. Date: Oct. 28, 2021

(65) Prior Publication Data
US 2023/0137586 A1 May 4, 2023

(30) Foreign Application Priority Data
Apr. 23, 2020 (EP) .................................... 20171000

(51) Int. Cl.
*F03D 7/04* (2006.01)
*F03D 7/02* (2006.01)
*F03D 17/00* (2016.01)

(52) U.S. Cl.
CPC ........... *F03D 7/042* (2013.01); *F03D 7/0264* (2013.01); *F03D 7/043* (2013.01); *F03D 7/045* (2013.01); *F03D 7/047* (2013.01); *F03D 17/00* (2016.05)

(58) Field of Classification Search
None
See application file for complete search history.

(56) References Cited

U.S. PATENT DOCUMENTS 9,926,913 B2 * 3/2018 Noto ....................... H02J 3/381
10,316,822 B2 * 6/2019 Hoffmann ............. F03D 7/0276
(Continued)

FOREIGN PATENT DOCUMENTS

KR 20120111143 A 10/2012

OTHER PUBLICATIONS

PCT International Search Report and Written Opinion of International Searching Authority dated Jul.20, 2021 corresponding to PCT International Application No. PCT/EP2021/059615 filed Apr. 14, 2021.

*Primary Examiner* — Juan G Flores
(74) *Attorney, Agent, or Firm* — Schmeiser, Olsen & Watts LLP

(57) ABSTRACT

A control arrangement of a wind turbine includes a watchdog including a reset module and a trigger module, wherein the watchdog reset module is configured to perform an internal reset when a sign-of-life signal is received from a remote communication system within a predetermined time limit, and wherein the watchdog trigger module is configured to issue a watchdog trigger when the predetermined time limit is exceeded; a sensor arrangement including a number of sensors configured to observe local parameters and to report local sensor data; and a wind turbine controller that initiates a local control sequence in response to the watchdog trigger, which local control sequence is configured to switch between a first mode of operation and a second mode of operation on the basis of the local sensor data. A method of operating a wind turbine is further provided.

14 Claims, 3 Drawing Sheets

(56) References Cited

U.S. PATENT DOCUMENTS

Figure 1:
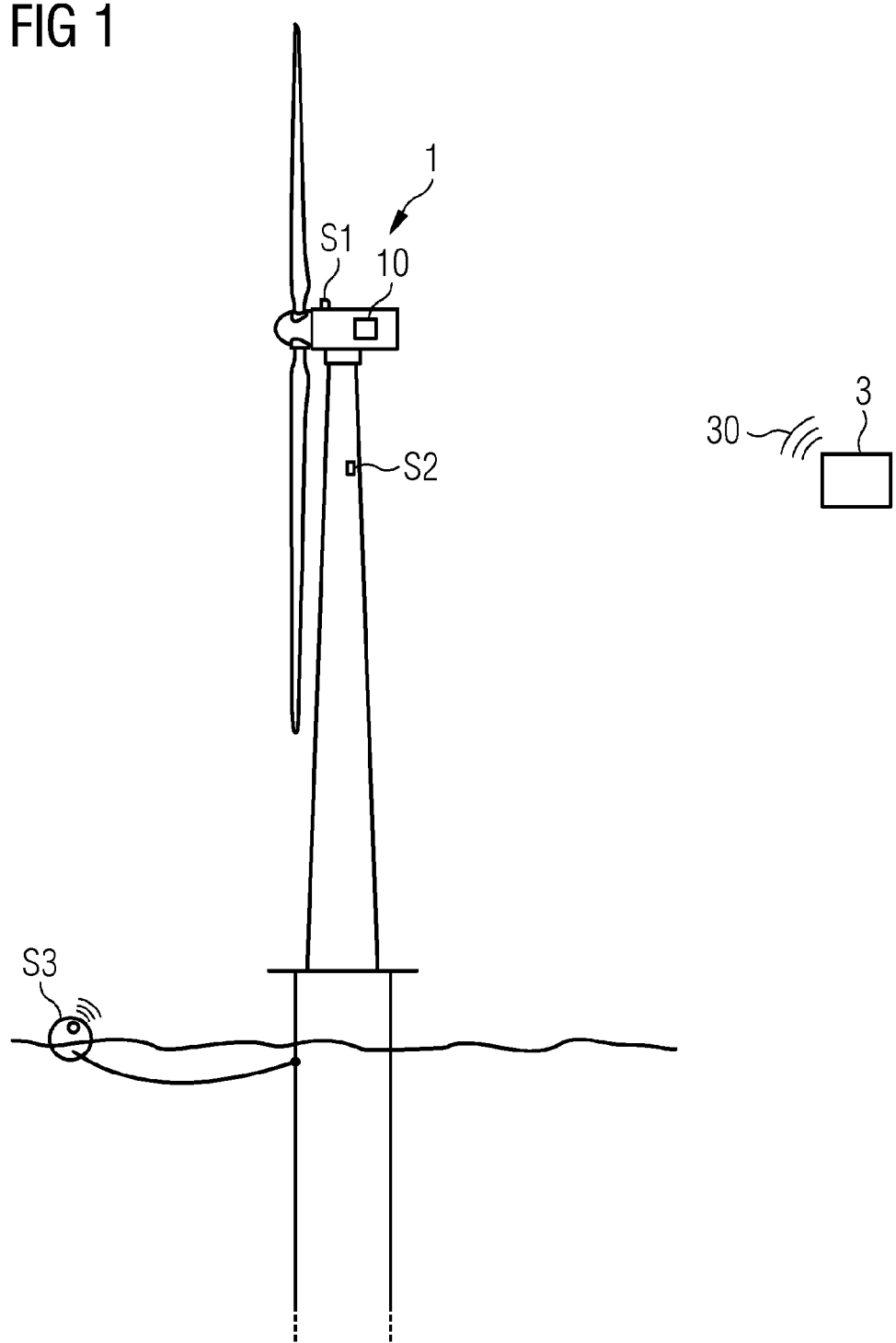

| | | | |
|---|---|---|---|
| 2014/0343740 A1* | 11/2014 | Eriksen | F03D 7/047 |
| | | | 700/287 |
| 2016/0327025 A1* | 11/2016 | Noto | F03D 9/25 |
| 2018/0119671 A1* | 5/2018 | Hoffmann | F03D 7/0276 |
| 2019/0249646 A1 | 8/2019 | Roark et al. | |

* cited by examiner

WIND TURBINE CONTROL ARRANGEMENT

CROSS-REFERENCE TO RELATED APPLICATIONS

This application claims priority to PCT Application No. PCT/EP2021/059615, having a filing date of Apr. 14, 2021, which claims priority to EP Application No. 20171000.1, having a filing date of Apr. 23, 2020, the entire contents both of which are hereby incorporated by reference.

FIELD OF TECHNOLOGY

The following relates to a wind turbine control arrangement and a method of operating a wind turbine.

BACKGROUND

A wind turbine may be operated under various different modes. In a normal mode of operation, for example, a wind turbine generates electricity for export to the grid. In various circumstances, a wind turbine may be put into an idle mode of operation in which power is not exported to the grid, and in which the aerodynamic rotor is allowed to turn slowly so that power can be generated for local consumption. Sometimes, it is necessary to protect the various components of a wind turbine from damage during extreme conditions. For example, damage to the rotor blades can be avoided by turning the hub to face downwind during a tropical cyclone (also referred to as hurricane or typhoon) and switching to an idle mode or even a standstill mode of operation in which the rotor brake is actuated to prevent the aerodynamic rotor from turning. In the event of a severe dust-storm or sand-storm, it may be beneficial to halt the wind turbine and to switch off all ventilation fans in order to prevent dust and sand from entering the nacelle and causing damage to machinery. Other extreme events may be winter storms, low-level jets, earthquakes, tsunami, extreme lightning storms, tornadoes, water spouts, and other types of natural phenomena.

The term "self-protection mode" is used herein when referring to a mode of operation whose primary purpose is to prevent damage to a wind turbine. Since a wind turbine is unable to export power to the grid during an idle mode or standstill mode, it will not switch to a self-protection mode unless it is necessary.

In a fully automated system, a wind turbine controller is able to monitor and evaluate the operating conditions and to decide whether or not it is necessary to switch from a normal mode of operation into a self-protection mode, and to decide when it is safe to return to a normal mode of operation.

However, a problem with fully automated systems is that these can report "false positives", i.e. an extreme condition is identified even though such a condition is not occurring or is not likely to occur. Following the "false positive" identification of the extreme condition, the wind turbine is put into a self-protection mode, and the attendant loss of revenue can have a negative impact on the performance of the wind turbine. For example, a self-protection mode for a tropical storm may involve turning the nacelle (and the aerodynamic rotor) to a downwind position and—when conditions have returned to normal—to turn the nacelle back to the upwind position again. In this orientation the wind turbine is not able to produce power for the electrical grid, so that unnecessary activation of the self-protection mode results in lost production.

This can also lead to problems if a wind turbine is off-grid, during which its auxiliary devices are run from a backup power supply such as a battery or diesel generator. If an overly-cautious fully automated system initiates a self-protection mode too early, the backup power supply may deplete before conditions have returned to normal. Without a power supply, the wind turbine is unable to perform any actions, including actions required during a self-protection mode.

Therefore, the operator (of a wind turbine or, more usually, of a wind park) may prefer to retain manual control (from a remote location) over any decision to enter a self-protection mode. Manual control is particularly relevant when an extreme environmental event can be foreseen, giving an operator time to manually issue a command to a wind turbine to enter a self-protection mode. Manual control can be done over a suitable communications channel such as a fibre-optic cable, by radio link, etc.

However, if such a command can only be issued manually, this option becomes unavailable when there is a fault in the communications channel. A wind turbine that is controlled in this way can be exposed to harm when the operator is unable to instruct the wind turbine to enter the self-protection mode.

SUMMARY

An aspect relates to provide a method of operating a wind turbine that overcomes the problems outlined above.

According to embodiments of the invention, the control arrangement of a wind turbine comprises a watchdog with a reset module and a trigger module. The reset module is configured to perform an internal reset when a sign-of-life signal is received from a remote communication system within a predetermined time limit, and the trigger module is configured to issue a watchdog trigger when the predetermined time limit is exceeded. The inventive control arrangement further comprises a sensor arrangement comprising one or more sensors configured to observe local parameters and to report local sensor data; and a wind turbine controller that initiates a local control sequence in response to the watchdog trigger, which local control sequence is configured to switch between a first mode of operation and a second mode of operation on the basis of the local sensor data.

An advantage of the inventive control arrangement is that the transition from a first mode of operation (e.g. a normal mode) and a second mode of operation (e.g. a self-protection mode) is automated when the communication link is not available. This means that the wind turbine controller can autonomously decide when to switch between modes, for example when to switch from a normal mode of operation into a safe mode or self-protection mode (and vice versa), even if the communication link is down.

Otherwise, with a functioning communication link, the operator is able to manually control such operation mode transitions. With the inventive control arrangement, a wind turbine will not autonomously switch to a self-protection mode as long as the communication link is functional, so that unnecessary or unwarranted idle states can be avoided. As a result, the annual energy production of a wind turbine can be improved.

A control arrangement which permits manual control of the operating mode transitions in the presence of a communications link and which autonomously controls the operating mode transitions in the absence of a communications link is not known from the prior art.

The inventive control arrangement can reliably protect a wind turbine during extreme environmental events which are relatively easy to predict, and for which corrective action can be taken to prevent damage to the wind turbine.

According to embodiments of the invention, the method of operating a wind turbine with such a control arrangement comprises the steps of monitoring a remote communications channel for a sign-of-life signal; issuing a watchdog trigger if a sign-of-life signal is not received within the predetermined time limit; obtaining local sensor data from the sensor arrangement; initiating a local control sequence in response to the watchdog trigger; and switching between a first mode of operation and a second mode of operation on the basis of the local sensor data while in the local control sequence.

An advantage of the inventive control method is that an autonomous decision to switch operation modes is only made by the wind turbine when the communication link is not available. As long as the communication link is available, the operator has full control over decisions regarding operating mode transitions.

The units or modules of the control arrangement mentioned above, in particular the watchdog and the local control sequence, can be completely or partially ccelera as software modules running on a processor of a wind turbine controller. A ccelerate largely in the form of software modules can have the advantage that applications already installed on an existing system can be updated, with relatively little effort, to perform the steps of the inventive method.

The term "watchdog" is used herein to refer to a hardware or software module that is configured to issue an alert or warning upon the absence of an expected signal. Other terms for such a module are "dead-man switch", "vigilance control", "Operator Presence Control (OPC)"; etc., as will be known to the skilled person.

In the following, without restricting embodiments of the invention in any way, it may be assumed that the remote control system issues a sign-of-life signal over the communication link at predetermined intervals, for example once every minute. A sign-of-life signal can be a simple pulse or pulse train, for example, toggling between 0 and 1 logic levels. Similarly, the watchdog trigger signal may be assumed to have a logic level of 0 when inactive and a logic level of 1 when activated.

The watchdog may be assumed to receive the sign-of-life signal from the communication link, and to comprise a counter that is reset whenever the sign-of-life signal is received. For example, a 0 to 1 transition resets the counter, which then resumes counting the elapsed time (e.g. to count the seconds). As long as the communication link is open and functioning, the sign-of-life signal will be issued at the predetermined regular intervals.

If the sign-of-life signal is expected once every minute, and the counter reaches a count of 60 seconds without being reset, the watchdog issues its alert, for example the watchdog trigger signal is pulled high. The absence of the sign-of-life signal indicates failure of the communication link. The watchdog trigger can remain at its "high" level during this state.

The sensor arrangement can comprise any number of sensors. For example, the sensor arrangement may comprise an anemometer for measuring wind speed, a hygrometer for measuring humidity, a barometer for measuring air pressure, a temperature sensor for measuring the ambient temperature, an accelerometer for detecting motion of the wind turbine tower, etc. Other sensors might be provided, for example a sensor to detect a rapid increase in water level (indicative of a tsunami), a seismic sensor to detect earthquake tremors, a camera arrangement with an image processor to detect a change in light level (low visibility in conjunction with a drop in relative humidity can be indicative of a sand-storm or dust-storm), etc. In an embodiment, the sensor arrangement comprises an evaluation module which is configured to identify an extreme event from the local sensor data. For example, by monitoring temperature, pressure and wind speed, the evaluation module can detect an approaching tropical storm.

The control sequence switches from a normal mode of operation to a self-protection mode of operation when the local sensor data indicates an extreme event. To avoid false alarms, the evaluation module may observe the sensor data continually, and may issue an extreme event alert only if the extreme event indication persists for a minimum duration, for example 15 minutes. This means that the control sequence will only switch from a normal mode of operation to a self-protection mode of operation if it is certain that an extreme event is taking place.

Similarly, to avoid premature return to a normal mode of operation, the evaluation module issues an "all clear" only if the extreme event indication has been absent for a minimum duration, for example 15 minutes. This means that the control sequence will only switch from the self-protection mode of operation to the normal mode if it is certain that the extreme event has passed.

At some time, the communications link may be restored. The sign-of-life signals will then be seen at regular intervals by the watchdog. After receiving a sign-of-life signal after receiving a sequence of sign-of-life signals, the watchdog counter is reset, and the watchdog trigger is pulled low. The wind turbine controller terminates the local control sequence in response to a watchdog reset, and then hands over control to the remote control system. From this point on, an operator can decide whether or not an operating mode transition is necessary.

BRIEF DESCRIPTION

Figure 2:
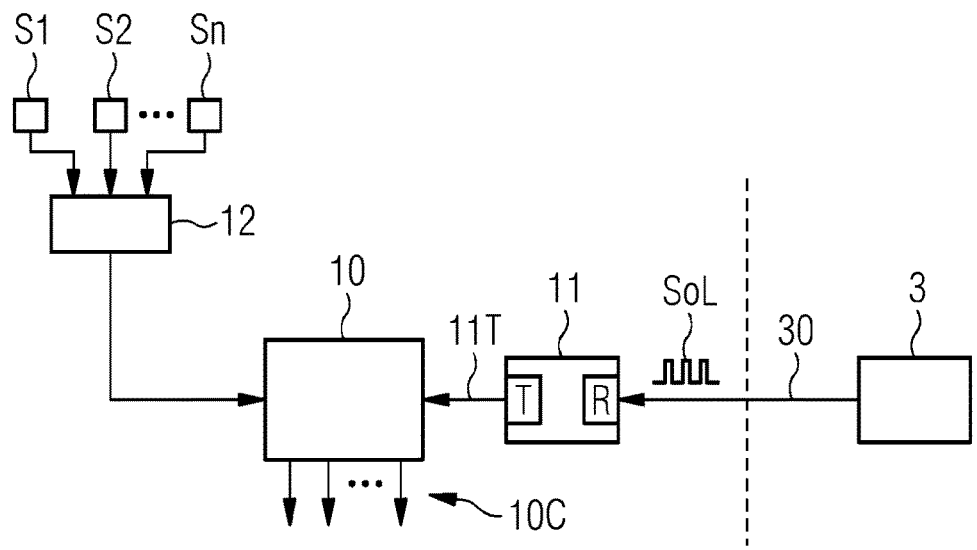
Figure 3:
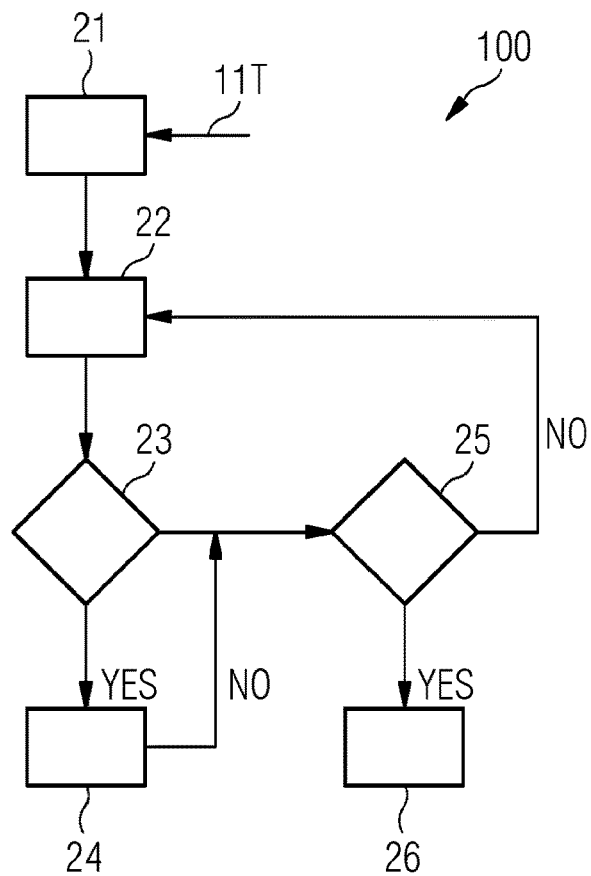
Figure 4:
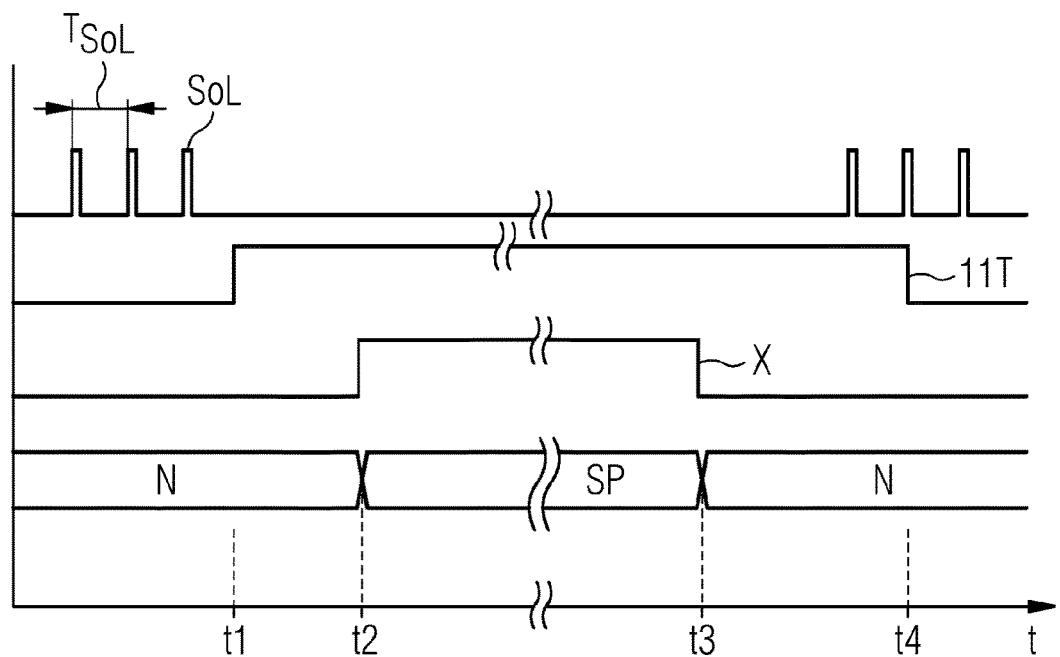
Figure 5:
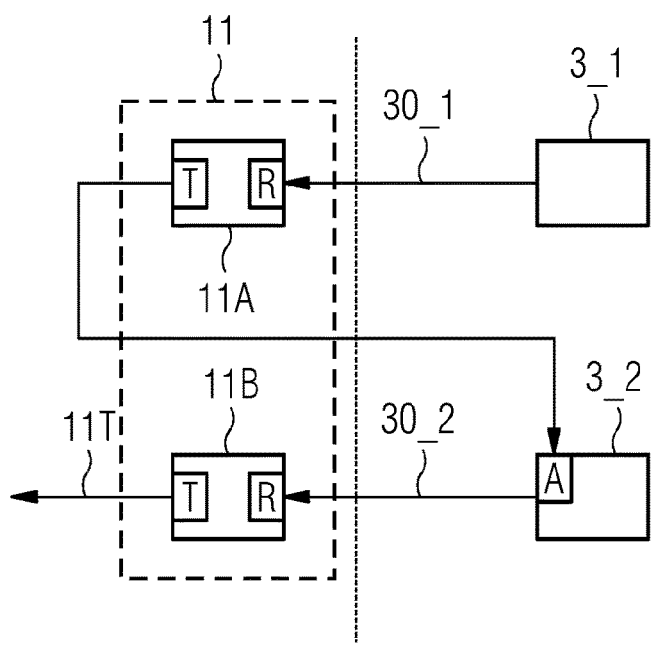
Figure 6:
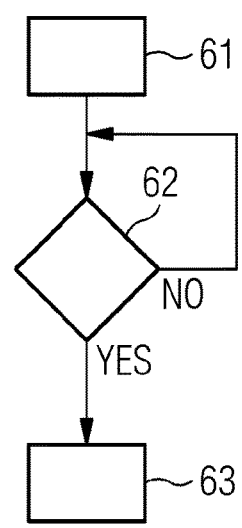

Some of the embodiments will be described in detail, with reference to the following figures, wherein like designations denote like members, wherein:

FIG. 1 shows a wind turbine;
FIG. 2 is a block diagram to illustrate an embodiment of the inventive control arrangement;
FIG. 3 is a flow chart to illustrate the inventive method;
FIG. 4 shows an exemplary timing diagram to illustrate the inventive method;
FIG. 5 is a block diagram to illustrate a further embodiment of the inventive control method; and
FIG. 6 is a block diagram to illustrate a conventional control method.

DETAILED DESCRIPTION

FIG. 1 shows a simplified schematic of a wind turbine 1 with its local controller 10 indicated simply as a block in the nacelle. Of course, a wind turbine controller can comprise various processing units and may be located in the tower interior. The diagram also indicates a remote control system 3, for example a park controller. For a wind turbine 1 that is part of a wind park (on land or offshore), a park controller can be located at a great distance. Communication between the wind turbine 1 and the remote control system 3 can be via a fibre-optic communications cable, for example. Alternatively, as indicated here, communication can be over a wireless link 30, e.g. by terrestrial radio link or by a communications satellite connection.

The remote control system 3 can issue commands to the wind turbine controller 10 to switch to a specific mode of operation. In this way, an operator can "manually" control the wind turbine 1. The inventive control arrangement proposes a way of enabling the wind turbine to assume control in the event that the communication link 30 should fail. To this end, the wind turbine 1 is equipped with a number of local sensors that can monitor and report local conditions. For example, the diagram shows a wind speed sensor S1, an accelerometer S2, and a level sensor S3. Of course, this is only by way of example, and the configuration of the sensor arrangement can depend on the location of the wind turbine and the local climate.

FIG. 2 is a block diagram to illustrate an embodiment of the inventive control arrangement. A remote communication system 3 is indicated, which may communicate with the wind turbine controller 10 over a communications link 30 such as a fibre-optic cable, by radio, by a satellite connection, etc.

The wind turbine controller 10 includes a watchdog 11. This is configured to monitor the time that elapses after it receives a sign-of-life signal SoL from the remote communication system 3. As long as the sign-of-life signal arrives at an internal reset module (labelled "R") of the watchdog 11 before a predetermined time limit is reached, the watchdog 11 resets and resumes its task of monitoring the elapsed time. If a sign-of-life signal is not received before the predetermined time limit is reached, an internal trigger module (labelled "T") of the watchdog 11 issues a trigger 11T to the wind turbine controller 10.

The control sequence 100 that is subsequently carried out by the wind turbine controller 10 is illustrated in FIG. 3 in the form of a flow-chart. In a first step 21, the trigger 11T initiates automated monitoring. In a subsequent step 22, signals from local sensors are collected and monitored. These signals can comprise any of: wind speed values from an anemometer; wind direction values from a wind vane; humidity values from a hygrometer; air pressure signals from a pressure sensor; temperature values from a thermometer; cceleratreon values from an accelerometer; etc.

In a subsequent step 23, the signals are evaluated to determine whether a significant event is taking place or is likely to take place. For example, an evaluation of the signals may indicate that a severe storm is imminent. If so, in a subsequent step 24, an appropriate self-protection mode of operation is initiated. To protect the wind turbine from damage during a hurricane, for example, the nacelle can be yawed so that the hub faces downwind. To protect the wind turbine from damage during a sandstorm, ventilation systems can be closed.

While in the normal mode of operation or after entering the self-protection mode of operation, the control sequence monitors the status of the remote communication interface in step 25. As long as the remote communication channel is unavailable, the control sequence 100 remains in the self-protection mode of operation and returns to step 22.

When the remote communication channel has been restored (by receiving a series of sign-of-life signals), the reset module of the watchdog 11 removes the trigger signal 11T (e.g. by pulling it low again) upon which the control sequence 100 deactivates the self-protection mode of operation (i.e. returns to the normal mode of operation) in step 26.

The wind turbine controller 10 issues appropriate control signals 10C depending on the current mode of operation. For example, when transitioning to the self-protection mode of operation because of an impending tropical storm, control signals can be issued to halt the aerodynamic rotor, to lock the rotor brake, and to yaw the nacelle so that the hub faces downwind.

FIG. 4 shows an exemplary timing diagram to illustrate the inventive method. As long as a communication link is available, a sign-of-life signal SoL is received at regular intervals $T_{SoL}$, for example every 60 s. An operator can issue manual control commands to the wind turbine as long as the communication link is available. If a sign-of-life signal SoL fails to appear as expected, the watchdog trigger 11T is pulled high (at time t1), and the wind turbine controller activates the local control sequence as explained in FIG. 2 and FIG. 3 above. In this local control sequence, as long as the sensor data report "normal" values, the wind turbine controller remains in a normal mode of operation N.

If an extreme event is inferred from the sensor data, this can be flagged as an "extreme state" X (at time t2). Inference of the extreme event causes the wind turbine controller to switch to a self-protection mode of operation SP. This will persist until the sensor data once again report normal values (at time t3), at which time the wind turbine controller can revert to the normal mode of operation N.

This mode transitioning is independent of the remote control system, since the communication link may still be unavailable and may be restored later, for example at time t4 as shown here. The advantage of the inventive control approach is that normal operation continues even though the communication link is down. With a prior art control method, the wind turbine may automatically be put in a self-protection mode of operation as soon as the communication link fails. With such an approach, the wind turbine would not export power from time t1 to time t4. In another prior art control method, the wind turbine simply remains in its present mode of operation (most likely the normal mode) when the communication link fails and waits for the link to be restored. With such an approach, the wind is unable to protect itself from damage during the extreme event.

With the inventive approach, normal operation is possible from time t1 to time t2 and again from time t3 to time t4; and the wind turbine is able to protect itself from damage during the extreme event between time t2 and time t3.

FIG. 5 illustrates a further embodiment of the inventive control method, for a wind turbine (or wind park) that can be controlled by a primary remote communication system 3_1 and (as backup) by a secondary remote communication system 3_2 in the event that the primary remote communication system 3_1 should fail. One communication link 30_1 can be provided as a fibre-optic cable, for example, while the other communication link 30_2 is a wireless communications channel such as a radio or satellite connection.

In this embodiment, a wind turbine controller 10 comprises two watchdogs 11A, 11B. A first watchdog 11A monitors the time that elapses after it receives a sign-of-life signal from the primary remote communication system 3_1. If a sign-of-life signal is not received before the predetermined time limit is reached, an internal module of the watchdog 11A issues an activation trigger which activates the secondary remote communication system 3_2.

A second watchdog 11B monitors the time that elapses after it receives a sign-of-life signal from the secondary remote communication system 3_2. If a sign-of-life signal is not received before the predetermined time limit is reached, an internal module of the watchdog 11B issues the trigger 11T which initiates the control sequence 100 described in FIG. 2 and FIG. 3 above.

FIG. 6 is a block diagram to illustrate a conventional control method 600. The control steps that are carried out by a wind turbine controller 10 are indicated on the left in the form of a flow-chart. To the right, a remote communication system RCS is indicated. This can issue a control signal 60 to the wind turbine controller, instructing it in step 60 to initiate a self-protection mode of operation by the following (simplified) control sequence 600:

The control sequence monitors the status of the remote communication interface in step 62. As long as the remote communication channel is unavailable, the control sequence 600 remains in the self-protection mode of operation and returns to step 62. This means that the control sequence 600 remains in the self-protection mode of operation even after conditions have returned to normal, i.e. conditions are such that the wind turbine could resume exporting power if it were able to return to a normal mode of operation. However, the control sequence 600 is unable to leave the self-protection mode of operation as long as it does not receive a control signal from the remote communication system RCS.

The control sequence 600 can only exit the self-protection mode and return to the normal mode when the remote communication channel has been restored, indicated in step 63. Until such time, the wind turbine has been unable to export power to the grid even though operating conditions were favorable.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A control arrangement of a wind turbine, the control arrangement comprising:
   a watchdog comprising a reset module and a trigger module, wherein:
      the watchdog reset module is configured to perform an internal reset when a sign-of-life signal is received from a remote communication system within a predetermined time limit, and
      the watchdog trigger module is configured to issue a watchdog trigger when the predetermined time limit is exceeded;
   a sensor arrangement comprising a plurality of sensors configured to observe local parameters and to report local sensor data; and
   a wind turbine controller that initiates a local control sequence in response to the watchdog trigger, the local control sequence configured to switch between a first mode of operation and a second mode of operation on a basis of the local sensor data.

2. The control arrangement according to claim 1, wherein the sensor arrangement comprises any of a wind speed sensor, a wind direction sensor, a hygrometer, a pressure sensor, a temperature sensor, an accelerometer, a seismometer, and an image sensor.

3. The control arrangement according to claim 1, comprising an evaluation module configured to identify an extreme event from the local sensor data.

4. The control arrangement according to claim 3, wherein the evaluation module is configured to infer an occurrence of any of a tropical storm, a dust-storm, a sand-storm, a winter storm, a low-level jet, an earthquake, a tsunami, a lightning storm, a tornado, and a water spout.

5. The control arrangement according to claim 1, wherein the control sequence is configured to switch from a normal mode of operation to a self-protection mode of operation when the local sensor data indicates an extreme event.

6. The control arrangement according to claim 1, wherein the control sequence is configured to switch from a self-protection mode of operation to a normal mode of operation when the local sensor data indicates the absence of an extreme event.

7. The control arrangement according to claim 1, wherein the wind turbine controller is configured to terminate the local control sequence in response to a watchdog reset.

8. The control arrangement according to claim 1, wherein the watchdog comprises
   a first watchdog configured to monitor a first communication link between the wind turbine and a primary remote communication system, and
   a second watchdog configured to monitor a second communication link between the wind turbine and a secondary remote communication system;
and wherein the secondary remote communication system is activated in response to the watchdog trigger issued by the first watchdog; and the local control sequence is initiated in response to the watchdog trigger issued by the second watchdog.

9. A wind turbine comprising:
   a control arrangement, the control arrangement including:
      a watchdog comprising a reset module and a trigger module, wherein:
         the watchdog reset module is configured to perform an internal reset when a sign-of-life signal is received from a remote communication system within a predetermined time limit, and
         the watchdog trigger module is configured to issue a watchdog trigger when the predetermined time limit is exceeded;
      a sensor arrangement comprising a plurality of sensors configured to observe local parameters and to report local sensor data; and
      a wind turbine controller that initiates a local control sequence in response to the watchdog trigger, the local control sequence configured to switch between a first mode of operation and a second mode of operation on a basis of the local sensor data.

10. A method of operating a wind turbine comprising a control arrangement including a watchdog comprising a reset module and a trigger module, wherein: the watchdog reset module is configured to perform an internal reset when a sign-of-life signal is received from a remote communication system within a predetermined time limit, and the watchdog trigger module is configured to issue a watchdog trigger when the predetermined time limit is exceeded; a sensor arrangement comprising a plurality of sensors configured to observe local parameters and to report local sensor data; and a wind turbine controller that initiates a local control sequence in response to the watchdog trigger, the local control sequence configured to switch between a first mode of operation and a second mode of operation on a basis of the local sensor data, the method comprising:
   monitoring a remote communications channel for the sign-of-life signal;
   issuing the watchdog trigger if the sign-of-life signal is not received within the predetermined time limit;
   obtaining local sensor data from the sensor arrangement;

initiating the local control sequence in response to the watchdog trigger; and switching between the first mode of operation and the second mode of operation on a basis of the local sensor data while in the local control sequence.

11. The method according to claim 10, wherein the control sequence switches from a normal mode of operation to a self-protection mode of operation when the reported commencement of an extreme event has persisted for a minimum duration.

12. The method according to claim 10, wherein the control sequence switches from a self-protection mode of operation to a normal mode of operation when the reported cessation of an extreme event has persisted for a minimum duration.

13. The method according to claim 10, comprising a step of resetting the internal reset module of the watchdog when the sign-of-life signal is received within the predetermined time limit.

14. A computer program product, comprising a computer readable hardware storage device having computer readable program code stored therein, said program code executable by a processor of a computer system to implement a method, according to claim 10 when the computer program is executed by the wind turbine controller.

* * * * *